US011994086B2

(12) United States Patent
Westberg et al.

(10) Patent No.: US 11,994,086 B2
(45) Date of Patent: May 28, 2024

(54) SYSTEM FOR RECOVERY OF ENERGY FROM A RESIDUAL GAS

(71) Applicant: Texel Technologies AB, Gothenburg (SE)

(72) Inventors: Heije Westberg, Hisings Backa (SE); Ulrika Grimfeldt, Mölndal (SE); Ann Grant, Gothenburg (SE); Victor Lie Gustavsson, Gothenburg (SE); Krister Salomonsson, Kristianstad (SE); Johan Lennblad, Gothenburg (SE); Arne Svensson, Torslanda (SE)

(73) Assignee: Texel Technologies AB, Gothenburg (SE)

( * ) Notice: Subject to any disclaimer, the term of this patent is extended or adjusted under 35 U.S.C. 154(b) by 0 days.

(21) Appl. No.: 18/268,150

(22) PCT Filed: Dec. 17, 2021

(86) PCT No.: PCT/EP2021/086389
§ 371 (c)(1),
(2) Date: Jun. 16, 2023

(87) PCT Pub. No.: WO2022/129465
PCT Pub. Date: Jun. 23, 2022

(65) Prior Publication Data
US 2024/0052798 A1 Feb. 15, 2024

(30) Foreign Application Priority Data
Dec. 18, 2020 (EP) ..................... 20215681

(51) Int. Cl.
F02G 1/055 (2006.01)
F23D 14/22 (2006.01)

(52) U.S. Cl.
CPC ............ F02G 1/055 (2013.01); F23D 14/22 (2013.01); F02G 2254/10 (2013.01); F02G 2254/15 (2013.01)

(58) Field of Classification Search
CPC .. F02G 1/055; F02G 2254/10; F02G 2254/15; F02G 2255/10; F23D 14/20; F23D 14/22
See application file for complete search history.

(56) References Cited

U.S. PATENT DOCUMENTS

| 6,513,326 | B1 | 2/2003 | Maceda et al. |
| 2006/0213196 | A1 | 9/2006 | Sukioka |
| 2020/0370508 | A1* | 11/2020 | Mook ..................... F02G 1/053 |

FOREIGN PATENT DOCUMENTS

WO    WO-2020/128023 A1    6/2020

OTHER PUBLICATIONS

International Search Report and Written Opinion, International Application No. PCT/EP2021/086389, dated Mar. 16, 2022.

* cited by examiner

Primary Examiner — Loren C Edwards

(57) ABSTRACT

A system for conversion of energy in a residual gas generated in an industrial process. The system includes a combustion chamber having a fuel inlet configured to receive a flow of residual gas for combustion in the combustion chamber. The combustion chamber further includes an air inlet. The system also includes a Stirling engine configured to convert heat from the combustion chamber into mechanical energy, the Stirling engine having a heat exchanger, wherein at least a portion of the heat exchanger extends into the combustion chamber. The system further includes a residual gas duct arranged for transporting the residual gas at atmospheric or near atmospheric pressure and an air duct arranged for transporting air at atmospheric or near atmospheric pressure. The system further includes a gas diffusion (Continued)

chamber including a residual gas inlet through which the residual gas enters the gas diffusion chamber from the residual gas duct, and a residual gas outlet in fluid communication with the fuel inlet of the combustion chamber, wherein the residual gas is transported in a diffusion direction from the residual gas inlet to the residual gas outlet. The gas diffusion chamber has such a shape that the flow of residual gas at the fuel inlet is substantially laminar and has a symmetric velocity profile.

15 Claims, 5 Drawing Sheets

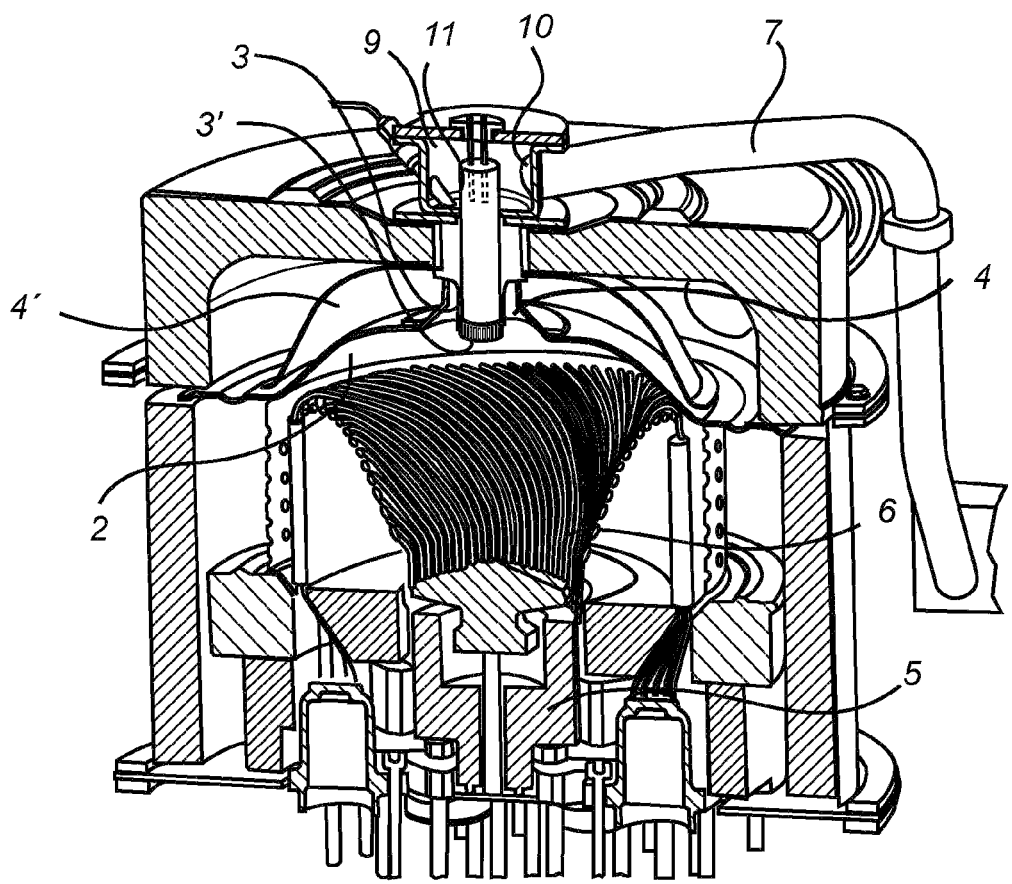
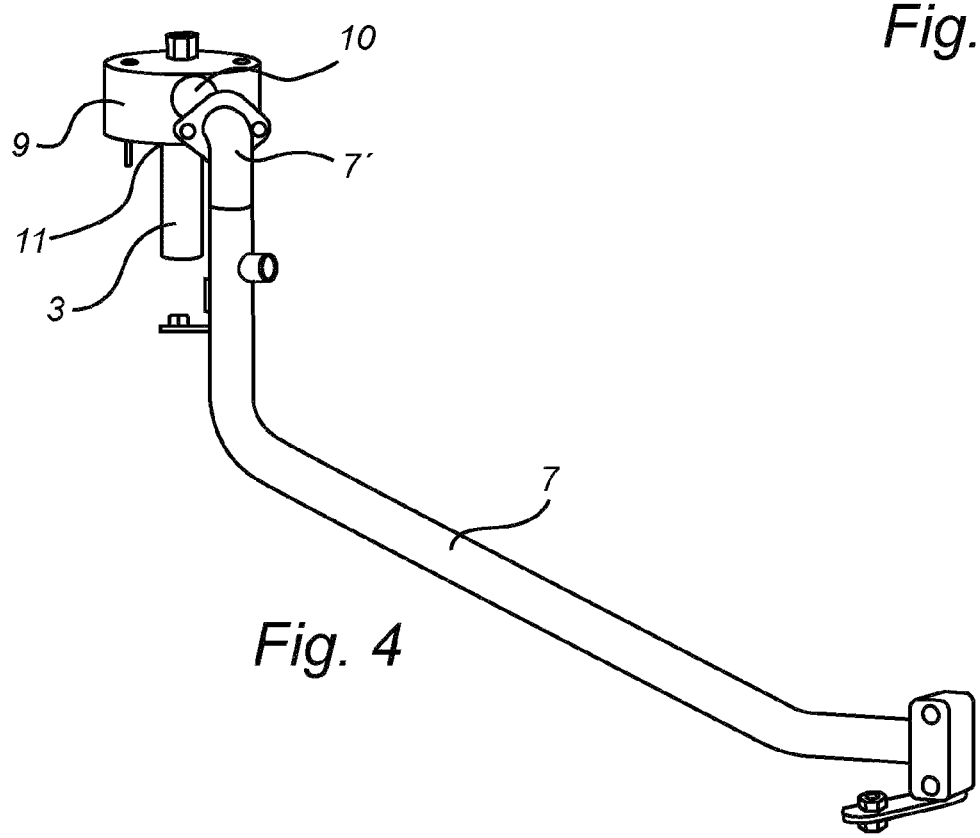
Fig. 3
Fig. 4

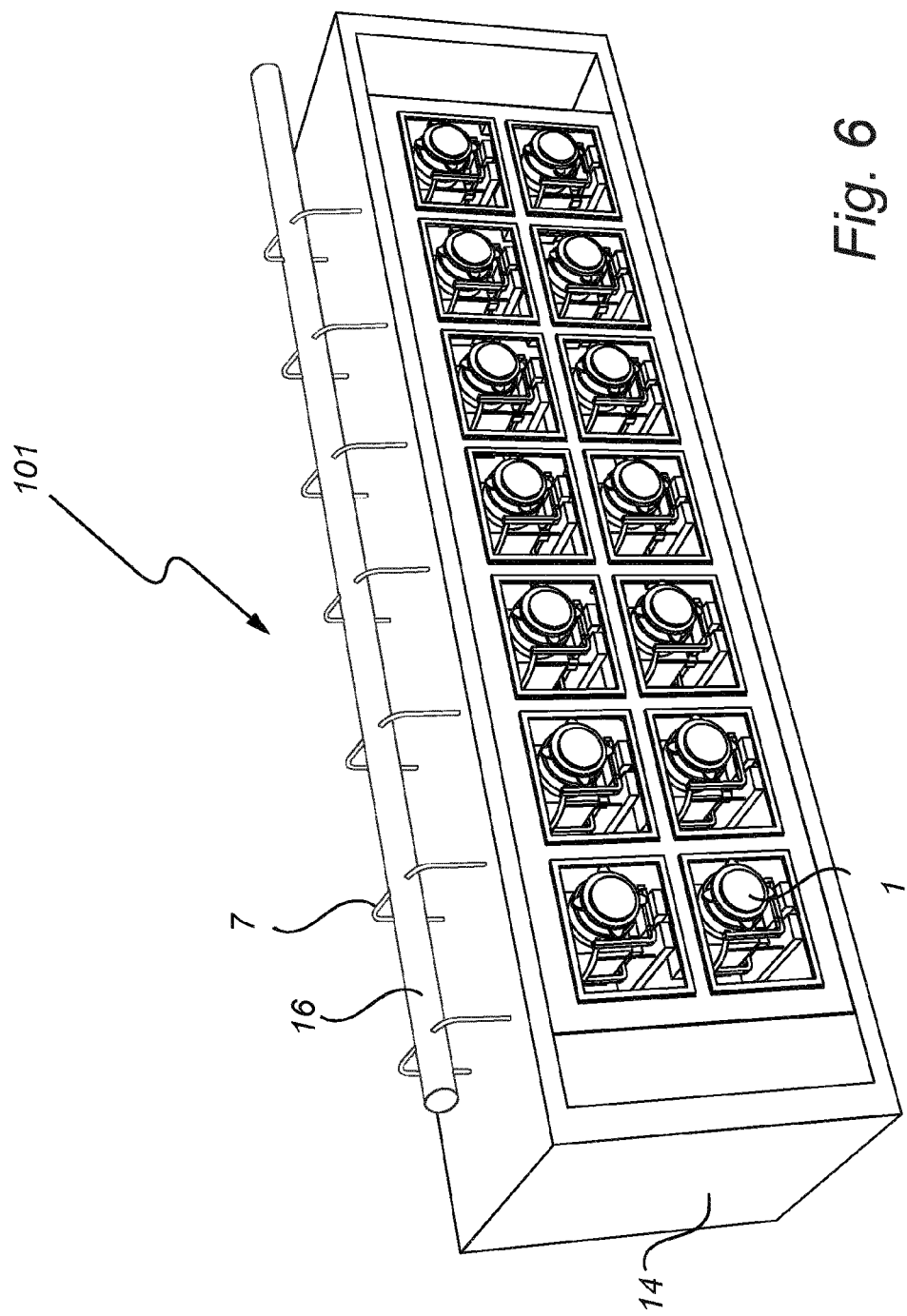

SYSTEM FOR RECOVERY OF ENERGY FROM A RESIDUAL GAS

TECHNICAL FIELD

The present invention relates to a system for conversion of energy in a residual gas generated in an industrial process, such as a metallurgic process, wherein the system provides improved efficiency of energy conversion.

BACKGROUND OF THE INVENTION

In many industries, various processes result in a residual gas, often including a mix of combustible gases. One specific example of such a process is the reduction process in smelting plants, wherein a carbon source, e.g. coke or charcoal, acts as a chemical reactant to remove oxygen from the ore, yielding a purified metal element as a product. The carbon source is oxidized in two stages. First, the carbon (C) reacts with oxygen ($O_2$) in the air and also with oxygen present in the ore to produce carbon monoxide (CO). Second, the carbon monoxide reacts with the ore and removes one of its oxygen atoms, releasing carbon dioxide ($CO_2$). Further, a water-gas-shift reaction occurs according to formula (I), thus producing hydrogen ($H_2$).

$$CO+H_2O \rightarrow CO_2+H_2 \qquad (I)$$

The residual gas thus mainly comprises CO and an arbitrary amount of $H_2$. The residual gas is normally transported to an external flare stack and combusted. However, flaring suffers from a number of disadvantages. First of all, combustion of the residual gas emits $CO_2$, which contributes to global warming. Further, the energy that may be present in the residual gas is wasted. Therefore, there have been developed internal flare units that may combust the residual gas in a combustion chamber such that the residual gas energy is transferred into a heat exchanger which drives a heat engine to produce electricity. One example of an engine suitable for such an application is a Stirling engine. Both transport of the residual gas and air, as well as combustion take place at atmospheric or near atmospheric pressure. The absence of high pressure in the system implies some challenges in terms of mixing of fuel and air and flame propagation.

Currently, there are several techniques that may be applied in order to improve mixing, flame propagation and combustion time. For instance, an external flare stack uses pressurized steam in order to create turbulence around the flare tip such that proper mixing of air and residual gas is obtained. However, while steam is appropriate when flaring externally, it would aggravate the performance of the energy conversion system comprising a Stirling engine.

Another option to optimize the fuel flow such that the flame is evenly propagated is to mix the residual gas and air prior to entering the combustion chamber. However, this is not possible due to presence of hydrogen in the residual gas flow. Since the incoming air is preheated to 500-750° C., e.g. by the exhaust gas leaving the combustion chamber, premixing of the residual gas comprising hydrogen and such a preheated air implies a risk of explosion.

US 2020/0370508 describes a closed cycle engines and system arrangements that may provide improved power output and power density, or further improved efficiency. The system arrangement of US 2020/0370508 comprises a fuel injector and a conditioning conduit, wherein the conditioning conduit may improve fluid dynamics properties such as pressure, pressure gradient, flow velocity, velocity gradient, turbulence, vorticity, curl, and so forth. The conditioning conduit may define a conduit volume selected to provide one or more desired fluid dynamics properties of combustion gas flowing therethrough, and/or to allow for mixing of intake air with recirculating combustion gas. In some embodiments, the conditioning conduit may be configured to swirl combustion gas flowing therethrough. For example, the conditioning conduit may establish or sustain a vortex, which may enhance combustion quality in the combustion chamber.

Finally, the most common technique is using high pressure injectors between the pressurized media and the combustion chamber such that optimized flame propagation is achieved by adapting shape, speed, distribution and mixing of the injected fuel. However, since the residual gas flow in internal flare units comprising a Stirling engine is at atmospheric or near atmospheric pressure, high pressure injectors cannot be utilized, which leads to challenges in adapting shape, speed, distribution and mixing of the injected fuel which in turn could lead to deteriorated efficiency.

Applying high pressure to the fuel medium has a negative impact on the overall efficiency of the energy conversion, since the pressurizing process requires energy. Further, when the residual gas has low energy content, and there is a large amount of residual gas in relation to the amount of air, the pressurizing prosses becomes even more energy-consuming.

Currently existing internal flare units normally utilize pipes comprising both horizontal and vertical portions for transport of the residual gas. Thus, a presence of a 90° bend pipes is inevitable. Lack of high pressure leads to the residual gas hitting the bend and starting to bounce within the pipe, creating asymmetric velocity profile or disturbed wave propagation that leads to poor mixing and an uneven flame propagation at the heat exchanger.

In order to optimize efficiency of the energy conversion system, it is of paramount importance that the heat exchanger receives equal amount of heat across its entire cross-section. This is the main reason why the flame in an internal flare unit should be as uniform as possible. Such a uniform flame may be obtained if the fuel flow has symmetric velocity profile, if the combustion time is minimized, and if mixing of fuel and air is sufficient. A symmetric velocity profile may be achieved by providing a sufficiently long pipe preceding the entry of the combustion chamber. However, long pipes increase bulkiness and costs of the entire system. Another option is using flow conditioners which may provide a symmetric velocity profile of the flow using only a short distance of the pipe. Such flow conditioners however suffer from disadvantage of adding pressure drop to the system, thus impairing the overall efficiency.

Considering the above, there is a need for a system for energy conversion from a residual gas, wherein the system should provide efficient mixing of the residual gas and air, a stable combustion and symmetric flame propagation, such that energy conversion efficiency is maximized.

SUMMARY OF THE INVENTION

The present invention thus provides an improved system for conversion of energy in a residual gas generated in an industrial process. The system of the present invention comprises a combustion chamber having a fuel inlet configured to receive a flow of residual gas for combustion in the combustion chamber. The fuel inlet may comprise a nozzle for dispersing the residual gas and facilitating mixing of the residual gas and air. The combustion chamber further comprises an air inlet. The combustion chamber may be of any suitable type known to a person skilled in the art. The combustion chamber may further have any size and shape that may be needed in order to meet requirements of a particular combustion process. The fuel inlet and the air inlet may have same or different cross-section, which may be circular, square, rectangular, elliptic or the like. The temperature in the combustion chamber may be from 600° C. to 1500° C., preferably from 750° C. to 1200° C. The combustion chamber normally comprises an exhaust gas outlet, through which an exhaust gas generated during combustion may escape the combustion chamber.

The system according to the present invention further comprises a Stirling engine configured to convert heat from the combustion chamber into mechanical energy. A Stirling engine is an external combustion engine, i.e. an engine which uses a heat-carrying medium to convert heat into mechanical (rotational) energy. The Stirling engine comprises a heat exchanger that has a cross-section. The cross-section of the heat exchanger may have any size and shape. The cross-section of the heat exchanger may be substantially equal to or greater than the inner cross-section of the combustion chamber in order to maximize energy conversion. At least a portion of the heat exchanger extends into the combustion chamber. The Stirling engine comprises a fluid circuit containing a compressible working fluid. The heat exchanger of the Stirling engine normally comprises a set of tubes for carrying the working fluid. The heat exchanger may be rotationally symmetric. By the term "rotationally symmetric" is in the context of the present invention meant the property a shape has when it looks the same after rotation by a partial turn. Thus, the heat exchanger of the Stirling motor may be triangular, square, pentagonal, hexagonal, octagonal, decagonal, dodecagonal or circular. The area of the heat exchanger may be from 0.1 to 4 $m^2$, preferably from 0.5 to 2 $m^2$.

The system of the present invention further comprises a residual gas duct being arranged for transporting the residual gas at atmospheric or near atmospheric pressure. By the term "atmospheric pressure" is meant a pressure of 1.01 bar. By the term "near atmospheric" is meant a pressure having a value close to the atmospheric pressure but being slightly below or above atmospheric pressure. The difference between atmospheric and near atmospheric pressure in the context of the present invention may be from 10 to 500 mbar, preferably from 50 to 150 mbar. The residual gas duct may transport the flow of residual gas from the place of origin, such as a smelting plant, towards the combustion chamber. Alternatively, the residual gas duct may transport the residual gas from a residual gas manifold to the combustion chamber, as will be described in greater detail below. The cross-section area of the residual gas duct may be adapted to the flow of residual gas. The residual gas duct may be positioned substantially horizontally. The length of the residual gas duct may be from 0.5 to 5 m, preferably from 0.7 to 1.2 m. The diameter of the residual gas duct may be 2-30 cm, preferably 4-15 cm.

The system of the present invention further comprises an air duct being arranged for transporting air at atmospheric or near atmospheric pressure towards the combustion chamber. The air may be preheated in the air duct to the temperature of 500-750° C., preferably 600-700° C. The preheating may be performed by means of the exhaust gas generated during combustion and escaping the combustion chamber through the exhaust gas outlet. To this end, the system may comprise an air heat exchanger. The air inlet may be arranged to receive air from the air heat exchanger. The exhaust outlet of the combustion chamber may be connected to the air heat exchanger, where it pre-heats the incoming air.

When the residual gas is transported through the residual gas duct at atmospheric or near atmospheric pressure, it is oftentimes turbulent or laminar asymmetric, primarily due to bends in the residual gas duct. Thus, the flow of the residual gas may comprise portions moving in different directions, or the flow of residual gas may be unevenly distributed across the cross-section area of the residual gas duct, which creates asymmetry. Should such an asymmetric flow of the residual gas enter the combustion chamber, the flame propagation towards the heat exchanger would be uneven.

In order to remedy this problem, the system of the present invention further comprises a gas diffusion chamber comprising a residual gas inlet through which the residual gas enters the gas diffusion chamber from the residual gas duct, and a residual gas outlet being in fluid communication with the fuel inlet of the combustion chamber. The residual gas is thus transported in a diffusion direction from the residual gas inlet to the residual gas outlet through the gas diffusion chamber. The diffusion direction may be substantially oriented towards the combustion chamber. When the residual gas enters the gas diffusion chamber, the velocity of the residual gas decreases. Subsequent acceleration of the residual gas towards the residual gas outlet, e.g. by means of a pressure difference, leads to a symmetric velocity profile of the flow of residual gas through the residual gas outlet and also through the fuel inlet into the combustion chamber.

It should be noted, that the residual gas outlet may coincide with the fuel inlet. In other words, the residual gas leaving the gas diffusion chamber may immediately enter the combustion chamber. Alternatively, the residual gas outlet may by connected to the fuel inlet by an intermediate duct, such that the residual gas leaving the gas diffusion chamber through the residual gas outlet is transported to the fuel outlet through the intermediate duct. The length of the intermediate duct should be kept to a minimum in order to avoid unnecessary pressure drop. Further, the intermediate duct should be free from bends such that the substantially laminar and symmetric flow of the residual gas is not disturbed in the intermediate duct.

According to the present invention, the gas diffusion chamber has such a shape that the flow of residual gas at the fuel inlet of the combustion chamber is substantially laminar and has a symmetric velocity profile. The term "at the fuel inlet" means the residual gas being in a position just before it leaves the fuel inlet and enters the combustion chamber. The term "velocity profile" means a graph of the speed of the residual gas flow as a function of distance perpendicular to the direction of flow. The velocity profile of the residual gas may have parabolic shape, i.e. the residual gas may have higher velocity in the central portion of the residual gas duct compared to the peripheral portions of the residual gas duct. The symmetric velocity profile will contribute to a uniform flame and flame propagation, such that the entire cross-section of the heat exchanger of the Stirling engine will receive substantially the same amount of heat, thus maximizing conversion efficiency of the system. Other factors contributing to a uniform flame are symmetric air flow and sufficient mixing of the residual gas and air.

It should be noted that when the fuel inlet comprises a nozzle, the flow of residual gas passing the nozzle and entering the combustion chamber will be dispersed and will no longer be substantially laminar. However, since the flow of residual gas is substantially laminar and has a symmetric velocity profile at the fuel inlet, the dispersion will be symmetric, mixing with air will be optimized, and the flame will be uniform.

A cross-section area of the gas diffusion chamber being perpendicular to the diffusion direction may be greater than a cross-section area of the residual gas inlet. Preferably, the cross-section area of the gas diffusion chamber being perpendicular to the diffusion direction is at least two times greater than the cross-section area of the residual gas inlet.

Further, the cross-section area of the gas diffusion chamber being perpendicular to the diffusion direction may be greater than a cross-section area of the residual gas outlet. Preferably, the cross-section area of the gas diffusion chamber being perpendicular to the diffusion direction is at least two times greater than the cross-section area of the residual gas outlet.

The gas diffusion chamber may be rotationally symmetric. The gas diffusion chamber may be triangular, square, pentagonal, hexagonal, octagonal, decagonal or dodecagonal or circular. The inner surface of the gas diffusion chamber may be crimped in order to maximize the inner surface area and provide improved deceleration of the residual gas.

At least one of the residual gas inlet and the residual gas outlet may be rotationally symmetrically arranged in the gas diffusion chamber.

The system of the present invention may further comprise a mixing area arranged in the combustion chamber adjacent to the fuel inlet and the air inlet. By the term "adjacent" in the context of the present invention is meant lying near, close, or contiguous, being adjoining or neighboring. Thus, the fuel and air may have to pass a mixing area before the combustion starts. The purpose of the mixing area is to reduce the diffusion controlled regime of the combustion, such that the combustion period is as short as possible and the flame is evenly distributed in the combustion chamber.

The system according to the present invention may further comprise an air diffusion chamber, wherein the air duct transports the air into the air diffusion chamber, and wherein the air inlet of the combustion chamber is in fluid communication with the air diffusion chamber. The aspects of the gas diffusion chamber discussed above may apply also to the air diffusion chamber. The air diffusion chamber may be arranged between the gas diffusion chamber and the combustion chamber. By having such an arrangement unintentional heating of the residual gas is avoided.

As mentioned above, the residual gas in the context of the present invention is a gas that is generated during an industrial process, in particular a metallurgic process, such as ore smelting in order to recover a base metal. The residual gas normally comprises at least one combustible gas. In particular, the residual gas in the context of the present invention may comprise carbon monoxide (CO) and hydrogen ($H_2$). The amount of $H_2$ in the residual gas may be up to 30 v/v %. The residual gas may consist of CO and $H_2$, or may comprise other gas species, such as various hydrocarbons ($C_xH_y$), carbon dioxide ($CO_2$), hydrogen sulfide ($H_2S$) and sulfur dioxide ($SO_2$).

The weight ratio of the residual gas and air entering the combustion chamber may be from 1:1 to 1:10, preferably 1:2 to 1:3. As may be seen, the fuel combusted in the combustion chamber comprises a significant portion of the residual gas in relation to the amount of air, which complicates the mixing process.

The residual gas may enter the combustion chamber through the fuel inlet at a certain gas velocity. Analogously, the air may enter the combustion chamber through the air inlet at a certain air velocity. The ratio between the greatest of the gas velocity and the air velocity and the lowest of the gas velocity and the air velocity may be below 3. For example, if the residual gas has velocity x m/s when entering the combustion chamber, and the air has velocity y m/s when it enters the combustion chamber, and x is greater that y, the ratio x/y should not exceed 3. Preferably, the ratio between the gas velocity and the air velocity is 1, i.e. the gas velocity is equal to the air velocity. Since the difference between the gas velocity and the air velocity is not allowed to be too great, the mixing process is facilitated, thus optimizing time of combustion and flame propagation.

As mentioned above, the transport of the residual gas as well as air occurs at atmospheric or near atmospheric pressure. In order to facilitate such a transport, the system may further comprise a fan arranged downstream of the combustion chamber. Moreover, at least one of the residual gas duct and the air duct may comprise a fan. However, it is desirable to keep the number of fans as well as the fan pressures in the system of the present invention to a minimum in order to maximize efficiency of the energy conversion system.

In order to be able to handle large flows of the residual gas, it may be necessary to combine a plurality of systems for conversion of energy from a residual gas as described above, such that a module for conversion of energy is formed. Such a module may comprise two or more systems according to the present invention. The residual gas duct and the air duct of each system may in this case be connected to a residual gas manifold and an air manifold, respectively. Each duct may be provided with a valve in order to enable disconnection of each system from the flow of residual gas and air. The residual gas manifold may be connected to a residual gas pipe that transports the residual gas from the place of origin, e.g. a smelting plant, towards the residual gas manifold. It should be noted that the dimensions of the residual gas pipe are usually significantly greater than the dimensions of the residual gas manifold and the residual gas duct.

The system of the present invention thus provides a highly efficient energy conversion, allowing significant electricity and cost savings, as well as reducing the global $CO_2$ emission.

BRIEF DESCRIPTION OF THE DRAWINGS

Embodiments of the invention will now be described by way of example with reference to the accompanying drawings, of which:

FIG. 3 shows a cross-sectional view of the gas diffusion chamber, the combustion chamber and parts of the Stirling engine;

FIG. 4 illustrates a perspective view of the residual gas duct and the gas diffusion chamber;

FIG. 6 depicts a module comprising a plurality of the systems for conversion of energy according to the present invention.

DETAILED DESCRIPTION OF THE INVENTION

Figure 1:
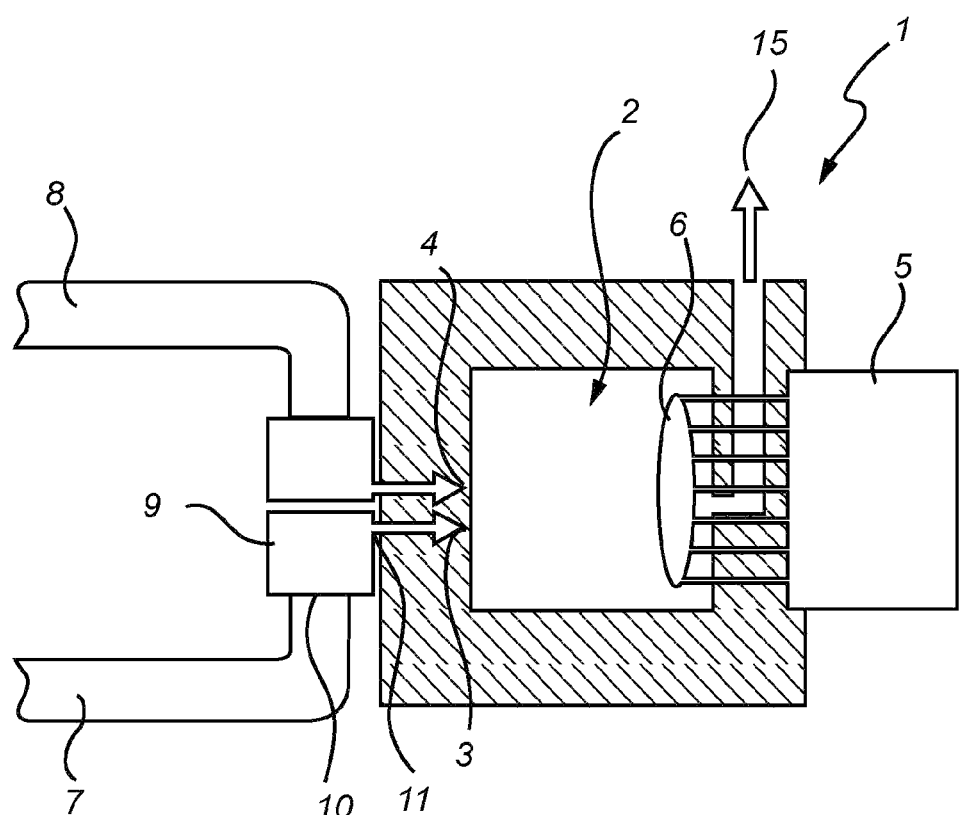
FIG. 1 depicts a schematic representation of a system for conversion of energy from a residual gas according to the present invention.

FIG. 1 shows a system 1 for energy conversion in a residual gas generated in an industrial process according to the present invention. The system 1 comprises a combustion chamber 2 having a fuel inlet 3 having a cross-section area and configured to receive a flow of residual gas for combustion in the combustion chamber 2. The combustion chamber further has an air inlet 4. As may be seen in FIG. 1, the fuel inlet and the air inlet are arranged in proximity of each other. The system 1 depicted in FIG. 1 further comprises a Stirling engine 5 having a heat exchanger 6 having a cross-section. A portion of the heat exchanger 6 extends into the combustion chamber 2. The system 1 also comprises a residual gas duct 7 being arranged for transporting the residual gas, and an air duct 8 being arranged for transporting air. Both of these fluids are transported at atmospheric or near atmospheric pressure.

A gas diffusion chamber 9 comprising a residual gas inlet 10 through which the residual gas enters the gas diffusion chamber 9 from the residual gas duct 7, and a residual gas outlet 11 being in fluid communication with the fuel inlet 3 of the combustion chamber 2, wherein the residual gas is transported in a diffusion direction from the residual gas inlet 10 to the residual gas outlet 11. The combustion chamber 2 comprises an exhaust gas outlet 15, through which an exhaust gas generated during combustion may escape the combustion chamber 2.

As described above, the advantage of having the gas diffusion chamber is creating a laminar flow having a symmetric velocity profile. As depicted in FIG. 1, the gas diffusion chamber 9 has such a shape that the flow of residual gas at the fuel inlet 3 is substantially laminar and has a symmetric velocity profile. In the particular embodiment depicted in FIG. 1, the cross-section of the gas diffusion chamber 9 being perpendicular to the diffusion direction is circular.

Figure 2:
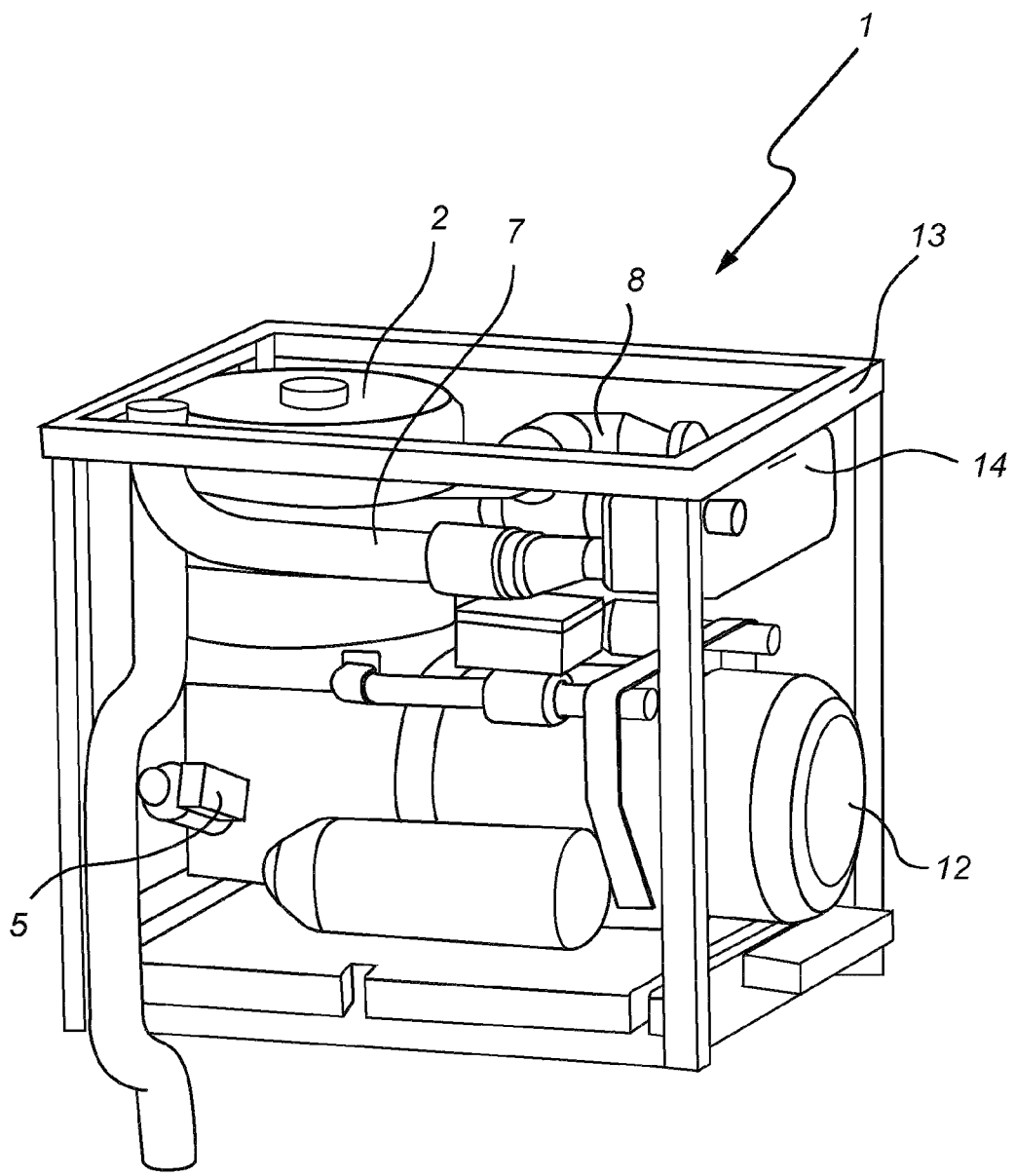
FIG. 2 illustrates a perspective view of the system according to the present invention.

With reference to FIG. 2, the system 1 includes a Stirling engine 5 and a combustion chamber 2. The Stirling engine 5 is further connected to an output shaft (not shown in FIG. 2), and the system 1 is thus configured to convert chemical energy in the residual gas to mechanical (rotational) energy. The output shaft is in turn connected to an electrical generator 12 for production of electric energy. The generator 12 may be connected to a local energy storage or power grid or be connected to supply power to the public power grid.

In the example illustrated in FIG. 2, the system 1 includes a separate generator 12. However, it is also possible that two or more systems are connected to a common generator. Indeed, all systems of a module as mentioned above may share one single generator.

FIG. 3 depicts a cross-section of the system 1 of the present invention. As may be seen, the combustion chamber 2 is dome-shaped and comprises a fuel inlet 3 and an air inlet 4. A Stirling engine 5 comprises a substantially circular heat exchanger 6 extending into the combustion chamber 2.

As may be seen in FIG. 3, a substantially cylindric gas diffusion chamber 9 is arranged upstream from the combustion chamber 2. The gas diffusion chamber 9 comprises a substantially circular residual gas inlet 10 through which the residual gas enters the gas diffusion chamber 9 from the residual gas duct 7. The gas diffusion chamber 9 further comprises a residual gas outlet 11 being in fluid communication with the fuel inlet 3 of the combustion chamber 2. The fuel inlet 3 comprises a nozzle 3' for dispersion of the residual gas, as has been mention previously. As shown in FIG. 3, the cross-section area of the gas diffusion chamber 9 being perpendicular to the diffusion direction is greater than the cross-section area of the residual gas inlet 10 and the cross-section area of the residual gas outlet 11.

As mentioned above, the residual gas is thus transported in a diffusion direction from the residual gas inlet 10 to the residual gas outlet 11 through the gas diffusion chamber 9. The diffusion direction is substantially vertical. When the residual gas is accelerated through the residual gas outlet 11, the flow of the residual gas obtains a symmetric velocity profile such that the disturbance of flow properties caused by the bend 7' of the residual gas duct 7 is eliminated.

FIG. 3 further illustrates an air diffusion chamber 4' arranged between the gas diffusion chamber 9 and the combustion chamber 2. The purpose of the air diffusion chamber is providing a symmetric flow of air.

The residual gas flow portion of the system 1 is depicted in greater detail in FIG. 4. The residual gas is transported from the place of origin or from the residual gas manifold through the residual gas duct 7 towards the gas diffusion chamber 9. When the residual gas passes the bend 7', the flow will be disturbed, causing turbulence and an asymmetric velocity profile. The residual gas enters the gas diffusion chamber 9 through the residual gas inlet 10. Within the gas diffusion chamber the flow of residual gas is allowed to decelerate and is slowly transported towards the residual gas outlet 11. When the flow of the residual gas is approaching the residual gas outlet 11, it is accelerated, thus leaving the gas diffusion chamber 9 through the residual gas outlet 11 such that the flow is substantially laminar and has a symmetric velocity profile, which will provide sufficient mixing, optimized combustion time and a uniform flame propagation, such that the heat is evenly distributed across the heat exchanger 6 in the combustion chamber 2.

Figure 5B:
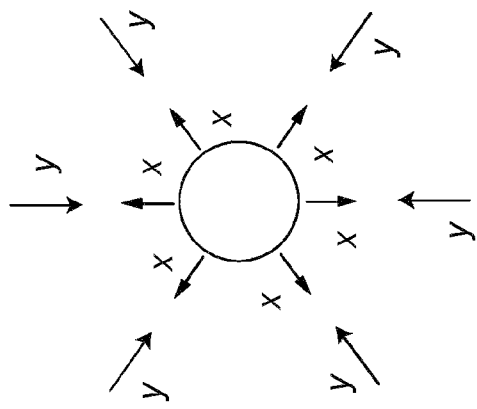
FIGS. 5a-5c depict a fuel inlet comprising a nozzle.
Figure 5C:
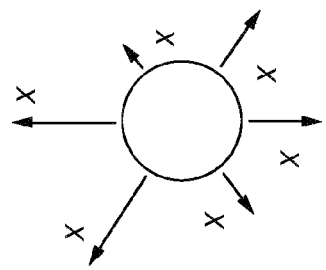
Figure 5A:
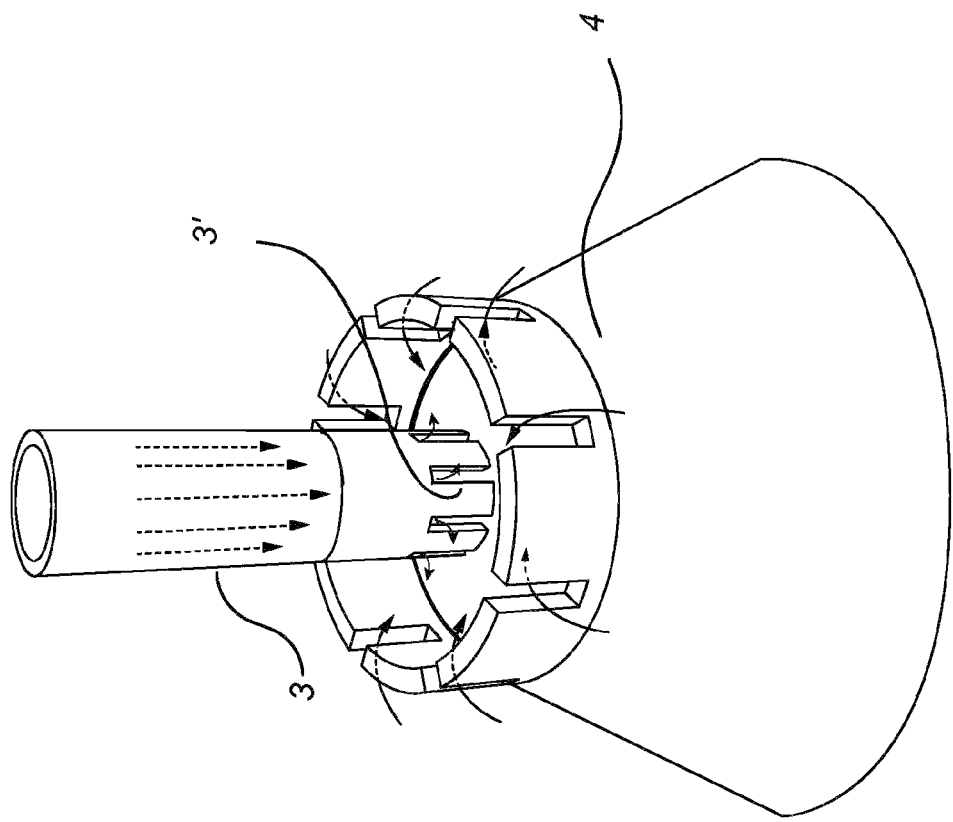

FIG. 5a shows the fuel inlet 3 comprising a nozzle 3' and the air inlet 4. As may be seen in FIG. 5a, the flow of residual gas is laminar and has a symmetric velocity profile in the fuel inlet (dashed arrows). After passing the nozzle 3' and when entering the combustion chamber 2, the flow of residual gas will be dispersed and will no longer be substantially laminar. However, since the flow of residual gas is substantially laminar and has a symmetric velocity profile at the fuel inlet 3, the dispersion will be symmetric in a manner shown in FIG. 5b, wherein x is the flow of the dispersed residual gas, and y is the flow of air. As may be seen in FIG. 5b, mixing with air is optimized, the combustion time will be minimized, and the flame will be uniform, provided that the flow of air is symmetric and uniform. For the sake of comparison, FIG. 5c is an illustration of the dispersion pattern of the residual gas when the flow of residual gas is not laminar and has a symmetric velocity profile, thus causing poor mixing and uneven flame propagation.

FIG. 6 illustrates a module comprising a plurality of systems 1 arranged in a suitable supporting housing 14. In the illustrated example, fourteen systems a 30 kW are arranged to provide a total power of over 400 kW. Each system 1 comprises one Stirling engine 5 and one combustion chamber 2 (similar in principle to the system in FIG. 1) and is configured to receive and combust residual gas from an industrial process. The flow of exhaust gas is provided in an exhaust manifold 16, which branches off to exhaust gas outlets 15 for transporting the exhaust gas from each of the combustion chambers 2.

Although the present invention has been described with reference to various embodiments, those skilled in the art will recognize that changes may be made without departing from the scope of the invention. It is intended that the detailed description be regarded as illustrative and that the appended claims including all the equivalents are intended to define the scope of the invention.

The invention claimed is:

1. A system for conversion of energy in a residual gas generated in an industrial process, said system comprising:
   a combustion chamber having a fuel inlet having a cross-sectional area and configured to receive a flow of residual gas for combustion in said combustion chamber, said combustion chamber further having an air inlet;
   a Stirling engine configured to convert heat from said combustion chamber into mechanical energy, said Stirling engine having a heat exchanger having a cross-section, wherein at least a portion of said heat exchanger extends into said combustion chamber;
   a residual gas duct being arranged for transporting said residual gas at atmospheric or near atmospheric pressure;
   an air duct being arranged for transporting air at atmospheric or near atmospheric pressure; and
   a gas diffusion chamber comprising a residual gas inlet through which said residual gas enters said gas diffusion chamber from said residual gas duct, and a residual gas outlet being in fluid communication with said fuel inlet of said combustion chamber, wherein said residual gas is transported in a diffusion direction from said residual gas inlet to said residual gas outlet;
   wherein said gas diffusion chamber has a shape such that said flow of residual gas at said fuel inlet is substantially laminar and has a symmetric velocity profile.

2. The system according to claim 1, wherein a cross-sectional area of said gas diffusion chamber that is perpendicular to said diffusion direction is greater than a cross-sectional area of said residual gas inlet.

3. The system according to claim 2, wherein said cross-section area of said gas diffusion chamber being perpendicular to said diffusion direction is greater than a cross-sectional area of said residual gas outlet.

4. The system according to claim 3, wherein said air diffusion chamber is arranged between said gas diffusion chamber and said combustion chamber.

5. The system according to claim 1, wherein said cross-section of said gas diffusion chamber is rotationally symmetric.

6. The system according to claim 1, wherein said system further comprises a mixing area arranged in said combustion chamber adjacent to said fuel inlet and said air inlet.

7. The system according to claim 1, wherein said system further comprises an air diffusion chamber, wherein said air duct transports said air into said air diffusion chamber, and wherein said air inlet of said combustion chamber is in fluid communication with said air diffusion chamber.

8. The system according to claim 1, wherein said residual gas comprises carbon monoxide and hydrogen.

9. The system according to claim 8, wherein said residual gas comprises up to 30% hydrogen by volume.

10. The system according to claim 1, wherein the weight ratio of said residual gas and said air is from 1:1 to 1:10.

11. The system according to claim 1, wherein said heat exchanger of said Stirling engine is rotationally symmetric and comprises a set of tubes.

12. The system according to claim 1, wherein said residual gas has a gas velocity in said fuel inlet, and said air has an air velocity in said air inlet, and wherein a ratio between a greatest of said gas velocity and said air velocity and a lowest of said gas velocity and said air velocity is below 3.

13. The system according to claim 12, wherein a ratio between said gas velocity and said air velocity is 1.

14. The system according to claim 1, wherein said system further comprises a fan arranged downstream of said combustion chamber.

15. The system according to claim 1, wherein at least one of said residual gas duct and said air duct comprises a fan.

* * * * *